(12) United States Patent
Noland et al.

(10) Patent No.: US 8,712,800 B2
(45) Date of Patent: Apr. 29, 2014

(54) SYSTEM OF PROVIDING AN INTERNET WEB SITE THAT ASSISTS MEDICAL PROFESSIONALS DRAFT A LETTER OF MEDICAL NECESSITY OR OTHER DOCUMENTATION FOR TRANSMISSION TO A THIRD PARTY PAYER ON BEHALF OF A PATIENT AND METHOD OF USE

(76) Inventors: James Noland, Erie, PA (US); Christopher Mentch, Erie, PA (US)

( * ) Notice: Subject to any disclaimer, the term of this patent is extended or adjusted under 35 U.S.C. 154(b) by 485 days.

(21) Appl. No.: 12/691,065

(22) Filed: Jan. 21, 2010

(65) Prior Publication Data
US 2010/0185463 A1    Jul. 22, 2010

Related U.S. Application Data

(60) Provisional application No. 61/146,345, filed on Jan. 22, 2009.

(51) Int. Cl.
*G06Q 10/00* (2012.01)

(52) U.S. Cl.
USPC .................................................. 705/3; 705/2

(58) Field of Classification Search
USPC ....................................................... 705/2, 3
See application file for complete search history.

(56) References Cited

U.S. PATENT DOCUMENTS

| | | | |
|---|---|---|---|
| 6,938,206 B2 | 8/2005 | Ingle et al. | 715/530 |
| 7,152,066 B2 | 12/2006 | Nelson et al. | 707/9 |
| 7,275,220 B2 | 9/2007 | Brummel et al. | 715/804 |
| 7,299,192 B2 | 11/2007 | Luttrell | 705/3 |
| 7,475,039 B2 | 1/2009 | Remington et al. | 705/40 |
| 2002/0046099 A1* | 4/2002 | Frengut et al. | 705/14 |
| 2003/0009354 A1* | 1/2003 | Arbogast et al. | 705/2 |
| 2007/0112819 A1* | 5/2007 | Dettinger et al. | 707/101 |

\* cited by examiner

*Primary Examiner* — Lena Najarian
(74) *Attorney, Agent, or Firm* — Jonathan M. D'Silva; MacDonald, Illig, Jones & Britton LLP

(57) ABSTRACT

The systems disclosed is an internet based application that allows clinical professionals to write letters of medical necessity to justify therapeutic services and devices recommended by physicians and/or clinicians. The letters of medical necessity are intended to be read by reviewers who determine whether or not a service or deice is medically necessary. The system herein requires that either a clinician or vendor begin the process by logging on the internet web site and agree to the user agreements as well as HIPAA compliance measures. Upon all information being entered into the system and justifications from a physician for the services and/or devices, the letter of medical necessity is then generated, signed by the clinician and sent to the third party payer for payment consideration.

4 Claims, 3 Drawing Sheets

SYSTEM OF PROVIDING AN INTERNET WEB SITE THAT ASSISTS MEDICAL PROFESSIONALS DRAFT A LETTER OF MEDICAL NECESSITY OR OTHER DOCUMENTATION FOR TRANSMISSION TO A THIRD PARTY PAYER ON BEHALF OF A PATIENT AND METHOD OF USE

CROSS-REFERENCE TO RELATED APPLICATIONS

The present application claims the benefit of U.S. Provisional Application No. 61/146,345 filed on Jan. 22, 2009, which is incorporated herein by reference.

FEDERALLY SPONSORED RESEARCH

Not Applicable

BRIEF DESCRIPTION OF THE DRAWINGS

These and other features, aspects and advantages of the present invention will become better understood with reference to the following description, appended claims and accompanying drawings where:

DESCRIPTION

Background

Figure 1:
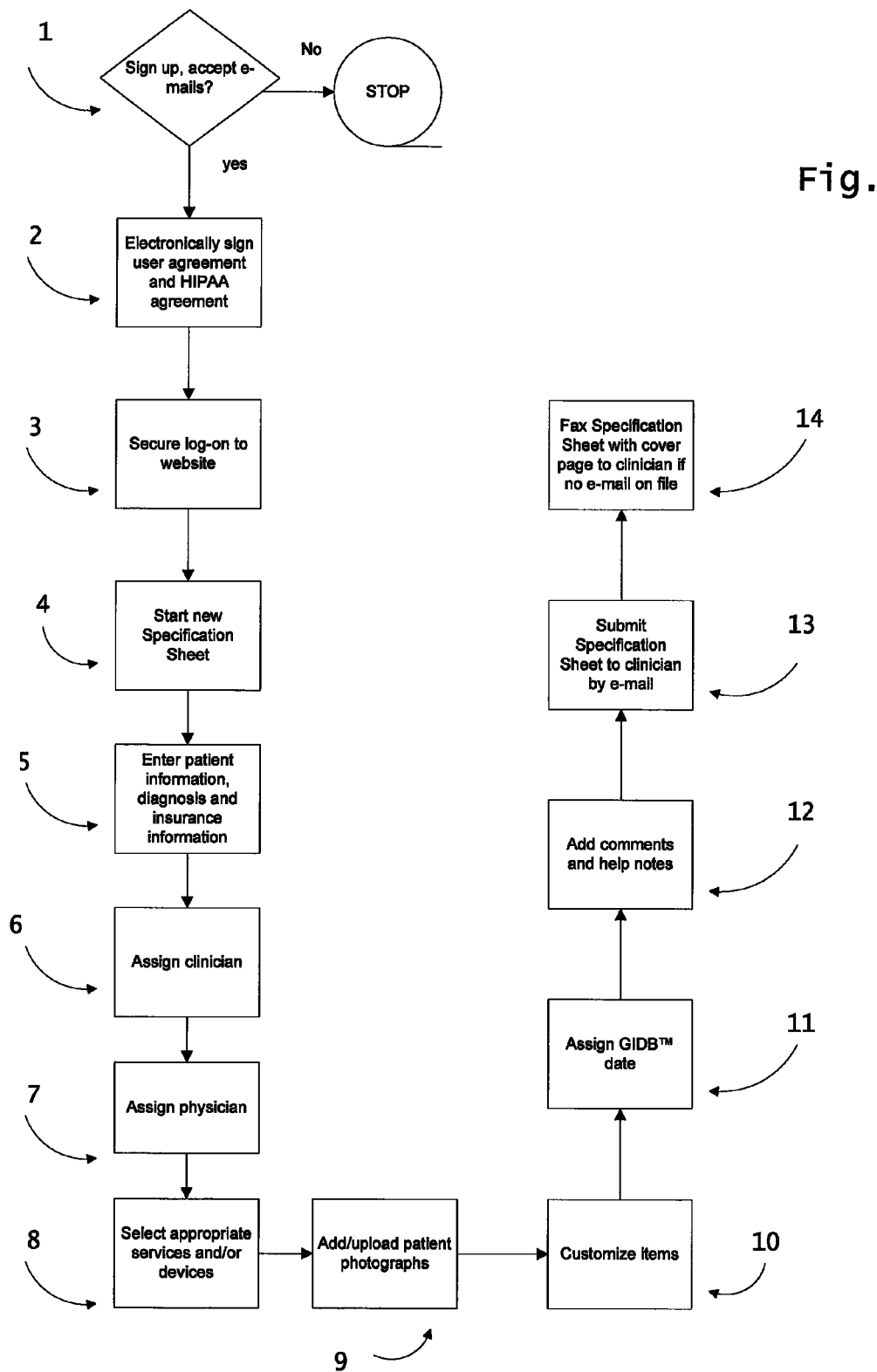
FIG. 1 is a flowchart showing the steps for a vendor-generated Specification Sheet up until it is sent to the clinician.

The system disclosed herein is an internet-based application that allows clinical professionals to write letters of medical necessity which justify therapeutic services and devices that have been recommended for patients. These letters of medical necessity are intended to be read by medical review personnel at third party payer entities and/or insurance companies. The medical reviewers determine whether a device or service is medically necessary and will approve or deny a clinician's request upon that determination. The system described herein further allows many different types of interactions between the individuals involved in a secure, Health Insurance Portability and Accountability Act ("HIPAA")-compliant and appropriate manner to efficiently effectuate the ultimate goal of drafting a letter of medical necessity for transmission to a third party payer and/or insurance company.

Generally, there are four (4) main parties involved in the transaction on the internet web site as disclosed herein: (1) a physician, (2) one or more clinicians/therapists, (3) the vendor of therapeutic services and/or devices and (4) a patient.

Typically, a physician refers a patient to a clinician. The clinician evaluates the patient and determines whether a therapeutic service or device is necessary, at which time a vendor is engaged. The vendor will recommend a specific service or device that will meet the patient's needs based upon the directions given by the clinician and/or physician.

The vendor will then work with the physician, the clinician and the patient's insurance company to provide the service or device necessary. The vendor must quote the items or services required and submit a Specification Sheet to the clinician in order for the clinician to generate a letter of medical necessity to submit to the patient's insurance company. The letter of medical necessity will usually be in the form of a letter, facsimile or electronic mail ("e-mail").

After reviewing and concurring with what the clinician had documented, the physician will then sign a prescription for the therapeutic service and/or device, draft a certificate of medical necessity, draft any other related documentation required by the patient's insurance company and will then co-sign the letter of medical necessity. This documentation is then submitted to the medical reviewer at the third party payer source and/or insurance company to determine medical necessity and coverage eligibility. If the services and/or devices are approved, then the items are procured by the vendor and delivered to the patient. The vendor then submits the bill for the approved services and/or devices to the third party payer and/or insurance company for payment.

The process of writing a letter of medical necessity is time consuming and wrought with technical perils for both the clinician and the vendor which, at each step, endangers the ultimate payment of the service or device for the patient. Typically, the clinician must take the Specification Sheet in one format and convert it to another to complete the letter of medical necessity. Some of the inefficiencies of this process include, but are not limited to:

- Typically, the clinician and the vendor do not physically meet to discuss each patent's documentation needs, which leads to an incomplete case work up and the possibility of forgotten necessary diagnoses, justifications, services and/or devices.
- The Specification Sheet must be generated by the vendor in a consistent format or the resulting letter of medical necessity from the clinician will be inadequate.
- The transmission of the Specification Sheet must be received by the clinician, which transmission is often not HIPAA-compliant.
- The clinician must write the letter of medical necessity specifically for an individual client. A "cookie cutter" letter of medical necessity is not effective in providing adequate information for the medical reviewer. Any missing or inadequate information in the letter of medical necessity will lead to a rejection of the request of the needed services and/or devices.
- Writing the letter of medical necessity can be very time consuming (1-3 hours) for the clinician and often is not reimbursed by third party payers.
- The clinician often times forgets to include all of the items to be justified.
- The clinician may not know how to write a letter of medical necessity or understand the context of the need for the letter of medical necessity and provide all of the information required in a particular letter of medical necessity so that the review process can be completed.
- The completed letter of medical necessity must be sent back to the vendor so that the appropriate services and/or devices can be ordered. This is often times lost or mishandled causing delays.
- There is no way for the vendor and clinician to collaborate other than this loose relationship.
- It is an industry recommendation that the vendor not write the letter of medical necessity because it may be considered a conflict of interest by some third party payers.

The Web Based System and Use Thereof as Disclosed

The system disclosed herein addresses many of the concerns noted above and establishes an internet based web site to produce a letter of medical necessity which has a higher probability of approval for the therapeutic services and/or devices from the third party payer.

The invention disclosed herein proposes two ways in which to generate a letter of medical necessity: (a) a vendor-generated Specification Sheet which is used to prompt a clinician to generate a letter of medical necessity and (b) a clinician-generated letter of medical necessity.

Vendor-Generated

For a vendor-generated Specification Sheet as set forth in FIG. 1, a vendor must sign up with the web site and accept e-mail verification (1). The vendor then agrees to a user agreement and executes an agreement to comply with HIPAA (2). The vendor then securely logs (3) into the internet website and starts a new Specification Sheet (4). The vendor enters patient information, diagnosis and insurance information (5). Then the vendor assigns a clinician (6) and assigns the patient's physician's information (7). The vendor then selects the appropriate services and/or devices, depending on the patient's circumstances (8) and can upload photographs if necessary (9). Additional items can be customized and added to the Specification Sheet (10). The vendor then assigns a GIDB™ date, a date in which the process needs to be completed (11). The vendor can then add additional comments and help notes for a notification message to the clinician (12). The vendor then submits the Specification Sheet to the clinician securely for notification by e-mail (13) or the Specification Sheet will be printed with a fax cover sheet and forwarded to the clinician (14).

Figure 2:
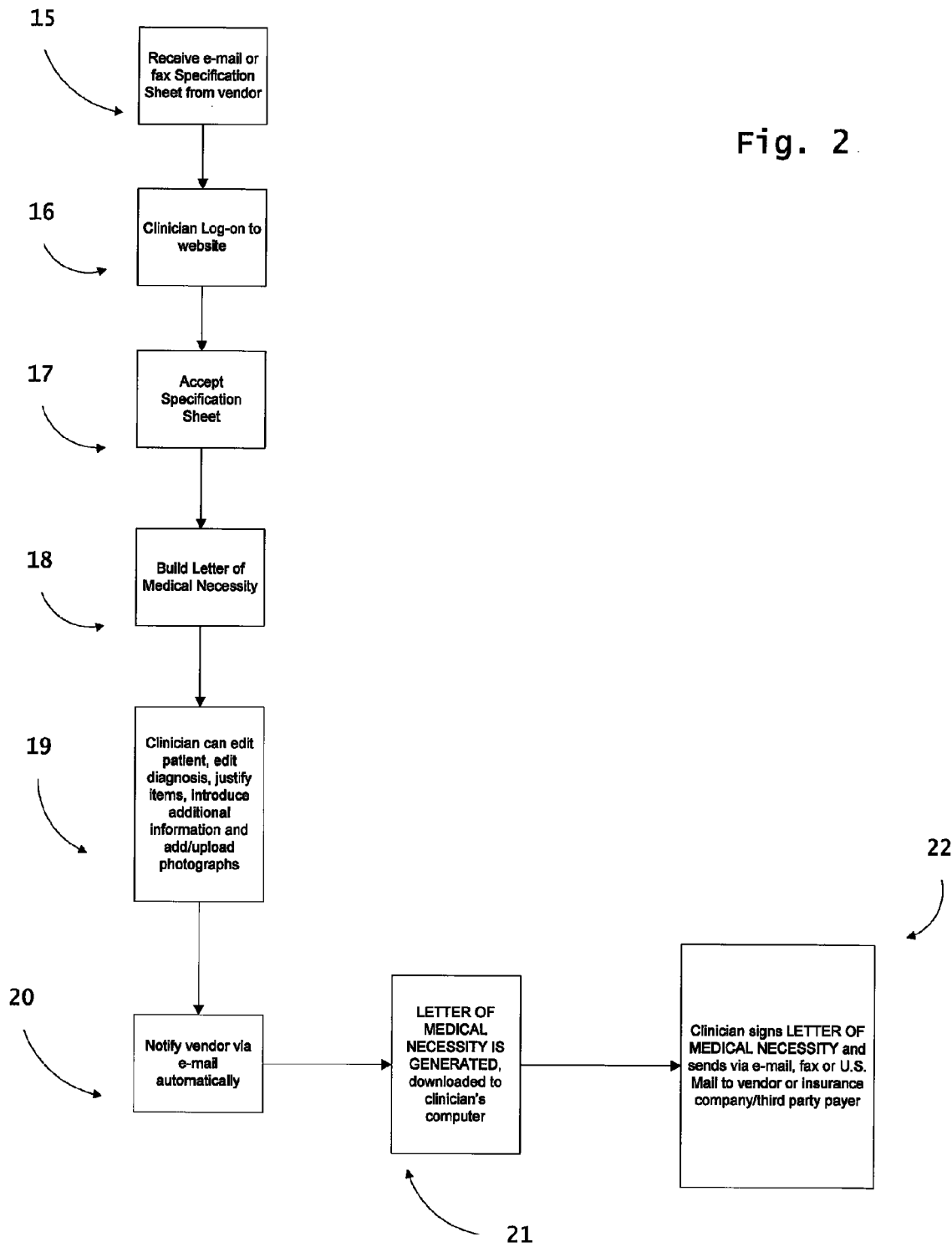
FIG. 2 is a flowchart showing the steps for a vendor-generated letter of medical necessity once a clinician receives a Specification Sheet from the vendor.

Upon receipt of either an e-mail or facsimile from the vendor (15) as set forth in FIG. 2, the clinician is requested to go to the secure website and log on (16) to see the Specification Sheet and to build the letter of medical necessity. If the clinician has not signed up with the website, the clinician will be prompted to do so. Upon signing in to the secure website, the clinician will be prompted to accept the Specification Sheet (17) to begin building the letter of medical necessity (18). The clinician can then edit patient information, diagnosis, item justifications, complete the introductory and clinical justifications and the closing as well as introduce additional information and upload photographs if necessary (19). Once the Specification Sheet is completed by the clinician, the vendor is automatically notified via secure e-mail (20) from the website and the appropriate documentation for therapeutic services and/or devices is considered and executed for the patient by the clinician. Once completed, the letter of medical necessity will then be generated and downloaded (21) to the clinician's computer. The clinician's final step (22) is to sign the letter of medical necessity and send via e-mail, fax or U.S. Mail to the vendor, insurance company or third party payer.

Clinician Generated

Figure 3:
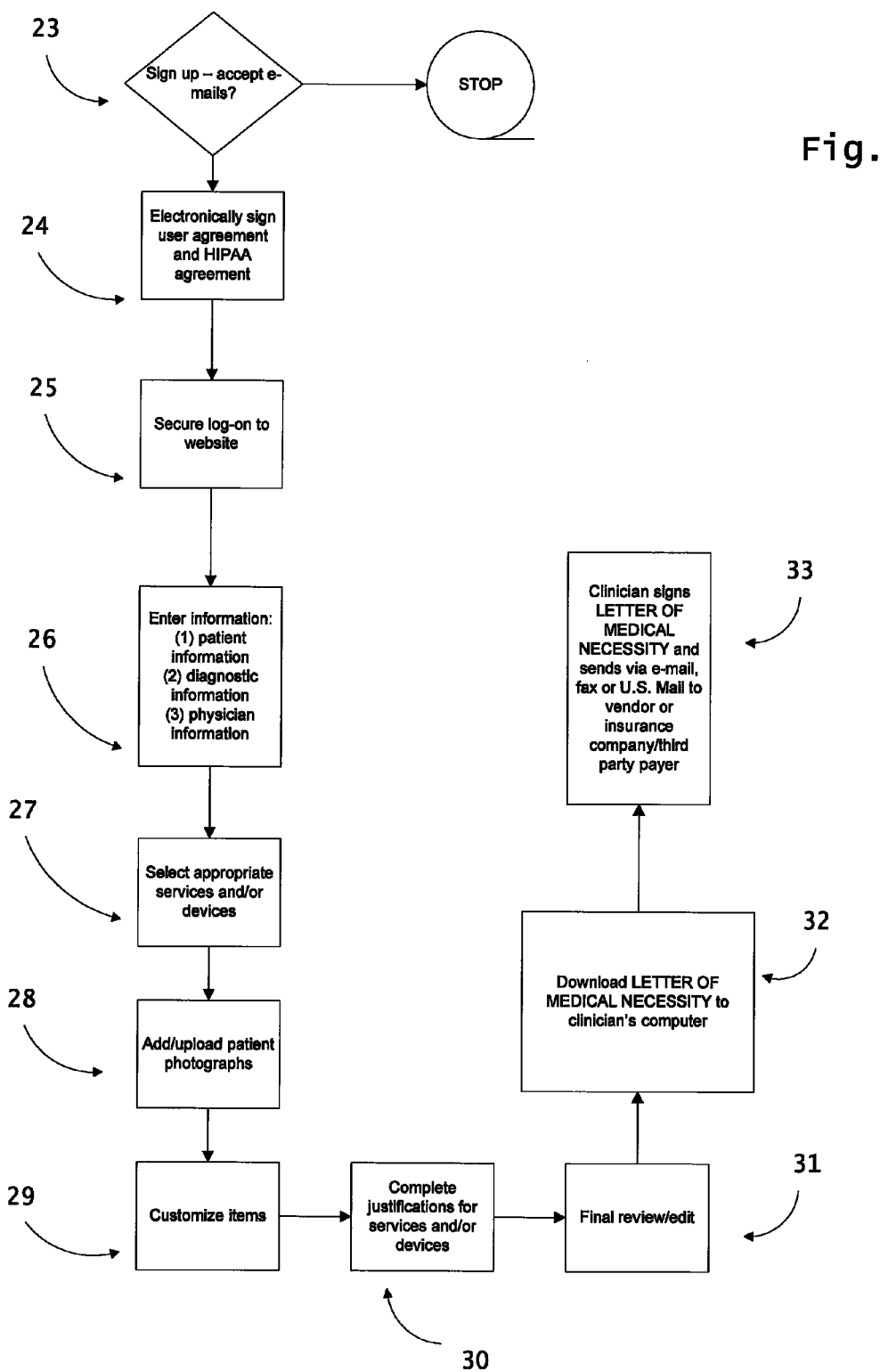
FIG. 3 is a flowchart showing the steps for a clinician-generated letter of medical necessity.

For a clinician-generated letter of medical necessity as set forth in FIG. 3, the clinician must sign up with the web site and accept e-mail verification (23). The clinician then agrees to a user agreement and executes a HIPAA-compliance agreement (24). The clinician then securely logs into the internet website (25) and starts a new letter of medical necessity. The clinician enters the patient information, diagnosis and the physician information (26). The clinician then selects the appropriate services and/or devices, depending on the patient's circumstances (27). The clinician can upload client photographs if necessary (28). Additional items can be customized and added to the letter of medical necessity (29). The clinician then completes the item justifications, completes the introductory and clinical justifications and the closing to the letter (30). The clinician performs a final review and edit (31). After final review, the clinician downloads the letter to his/her computer (32). The clinician's final step (33) is to sign the letter of medical necessity and send via e-mail, fax or U.S. Mail to the vendor, insurance company or third party payer.

Note that after a completed and accepted letter of medical necessity (whether it be vendor-generated or clinician-generated) has been downloaded to the clinician's computer, the clinician can send either via facsimile or regular mail the completed and executed letter of medical necessity to the vendor or the patient's third party payer and/or insurance company as the situation demands.

The internet based web site disclosed herein also utilizes the following ideas and concepts:

The idea of collaboration in a web based application between vendor and clinical entities for the completion of joint tasks with a work flow and business model that respects conflict of interest and privacy concerns.

The code and methods of access, creation, editing, handling, viewing and using the website in a simple interface.

The concept of using client data (client name, diagnosis, gender, etc.) to orient the content of the letter via the application of "handles" and "space holders" for that information in the written code which comprises and is used to create the specific justifications of the therapeutic services and/or devices to create the letter itself.

The concept of storing of and use of the justifications that the clinician modifies from the provided stock text or text that is uniquely created as the default justification text for each individual service and/or device that is to be justified.

The concept of creation of a letter of medical necessity in the clinicians own words from a Specification Sheet created by the vendor using the source file that is unique to that clinician. In other words, the process of using the Specification Sheet services and/or devices created by the vendor to identify same/similar items created or maintained by the clinician for the purpose of writing letters and then using those matches to create the basis for the letter of medical necessity and the code and methods of access, creation, editing, handling, viewing and using those unique matches in a simple interface specific to that vendor, client and therapist combination.

The concept of allowing alternate justifications to be attached to each therapeutic service and/or device and the code and methods of access, creation, editing, handling, viewing and using those alternate justifications in a simple interface specific to that item.

The concept of using existing letters or the creation of unique data sets for use as a template that then allows for the patient data to be imported using the unique code and process disclosed herein.

The concept of secure messaging between vendor and the physician/clinician for the purpose of collaboration in a internet based application for generating letters of medical necessity and other tasks with a work flow and business model that respects conflict of interest and privacy concerns.

The process of and concept of handling HIPAA compliance using a standard "no last name" option as a default and the code and methods of access, creation, editing, handling, viewing and using those names and HIPAA option selection in a simple interface specific to that service and/or device.

The concept of assigning a clinician to a Specification Sheet for the eventual creation of a custom letter of medical necessity and the work flow process related to that item and the code and methods of access, creation, editing, handling, viewing and using those Specification Sheets in a simple interface specific to that service and/or device.

The concept of GIDB™ dates and their use in the application as disclosed.

The concept of the GIDB™ date in the work flow process related to processing of therapeutic services and/or devices.

Codes and process for the uniform application of gender selection and name handling throughout the letter of medical necessity generation process and methods of access, creation, editing, handling, viewing and using that process in a simple interface.

The concept of using and the code and method for handling and insertion of specific charts, clinical scales and assessment tools into letters of medical necessity as regular part of the public relations and target advertising to specific user demographics (gender, age, clientele, letter purpose, primary therapeutic services and/or devices, geographic location, etc.) and process and methods of access, creation, editing, handling, viewing and using that process in a simple interface.

The clinician's accepting or rejecting of a Specification Sheet and process and methods of access, creation, editing, handling, viewing and using that process in a simple interface.

While accepting a Specification Sheet from a vendor, the process of detecting similar clients and choosing the correct client to assign the Specification Sheet.

The merging of patient information from the vendor's file to the clinician's file and methods of access, creation, editing, handling, viewing and using that process in a simple interface.

While accepting a Specification Sheet, the process of cross referencing vendor's therapeutic services and/or devices with the clinician's therapeutic services and/or devices. If a match is found, the clinician's therapeutic service and/or device is automatically selected. If an item is missing, the process of requesting input from the clinician to select their matching therapeutic services and/or devices or choosing to create a new custom therapeutic service and/or device in the clinician's profile and methods of access, creation, editing, handling, viewing and using that process in a simple interface.

While accepting a Specification Sheet, the process of cross referencing vendor's physician list, client list and diagnosis list with the clinician's physician list, client list and diagnosis list. If a match is found in any or all of the lists, the physician, client and/or diagnosis is automatically added. If an item is missing, the process of requesting input from the clinician to select their matching physician, client or diagnosis or choosing to create a new custom physician, client or diagnosis in the clinician's profile and methods of access, creation, editing, handling, viewing and using that process in a simple interface.

The ability to re-prioritize selections such as diagnoses, insurance carriers and therapeutic services and/or devices and methods of access, creation, editing, handling, viewing and using that process in a simple interface.

Creating custom therapeutic services and/or devices and methods of access, creation, editing, handling, viewing and using that process in a simple interface.

Initial validation of therapeutic services and/or devices default justifications before downloading letter and methods of access, creation, editing, handling, viewing and using that process in a simple interface.

Process for this work flow as devised in an internet based website application and methods of access, creation, editing, handling, viewing and using that process in a simple interface.

From the descriptions above, a number of advantages of the system and method become evident:

1. An environment for physicians, clinician and vendors to remotely communicate and collaborate to address a patient's therapeutic service and/or device needs.
2. A simple internet based interface that is user friendly and accomplishes its goals of drafting a letter of medical necessity on behalf of a patient which allows the physician and/or clinician to easily and efficiently effectuate their clinical goals without substantial technological expertise from the physician, clinician or vendor.
3. The clinician is able to customize the letter of medical necessity with the clinician's own language, justifications and even preferences for certain therapeutic services and/or devices.
4. A way to draft a letter of medical necessity with individuality without the letter looking like it was produced with no input from the medical professionals, i.e. it does not look like a "cookie cutter" letter.
5. Permits the insertion of alternate justifications to be attached to each therapeutic service and/or device.
6. Allows for a letter of medical necessity to be created beginning from a Specification Sheet (vendor-generated) or from clinician input (clinician-generated) without conflict of interest, privacy, HIPAA or collusion issues between the clinician and the vendor.
7. Allows for secure messaging between the vendor and clinician/physician for collaboration in a way that respects conflict of interest and privacy concerns.

What is claimed is:

1. A computer-implemented method of remotely collaborating on an internet website to create a letter of medical necessity comprising the steps of:

providing a vendor with a network server having an interface, the interface connected to the website through the network server, wherein the network server comprises a processor configured to perform the following steps, based upon input received from the vendor:

(a) securely logging on to the website;
(b) starting a new specification sheet;
(c) entering patient information, diagnosis information, and insurance information;
(d) designating a clinician;
(e) selecting appropriate therapeutic services and/or devices; and
(f) entering customized items of information in the interface;

the website applying handles and space holders to the entered items of information used to create a justification of the therapeutic services and/or devices;

assigning a date to complete the project;

adding comments and help notes;

submitting information to the designated clinician's computer; and providing the designated clinician with a computer connected to the network server having the interface, the interface connected to the website through the network server, wherein the computer comprises a processor configured to execute the following steps, based upon input received from the designated clinician:

(a) securely logging on to the internet website;

(b) receiving confirmation from the designated clinician regarding the specification sheet of correct patient information, diagnosis information, and insurance information;
(c) editing the patient information, diagnosis information, justification of items, and customized items of information;
(d) notifying the vendor of updates made by the designated clinician automatically by e-mail;
(e) instructing the interface to automatically draft and generate the letter of medical necessity through the network server and the network server comprising the processor automatically drafting and generating the letter of medical necessity;
(f) downloading the letter of medical necessity to the clinician's computer and
(g) instructing the clinicians' computer to transmit the letter of medical necessity to a vendor, insurance company, or third party payer and the interface transmitting the letter of medical necessity.

2. The method of claim 1 further comprising the step of uploading patient photographs.

3. The method of claim 1, wherein the entered information further includes gender information, and the handles and space holders are used to modify gender pronouns in the letter of medical necessity.

4. The method of claim 1, comprising a further vendor function of importing additional items of information from a menu in an interface.

* * * * *